Aug. 30, 1927.
J. KEARNS
1,640,834
MACHINE FOR TREATING RUBBER
Original Filed May 16, 1922
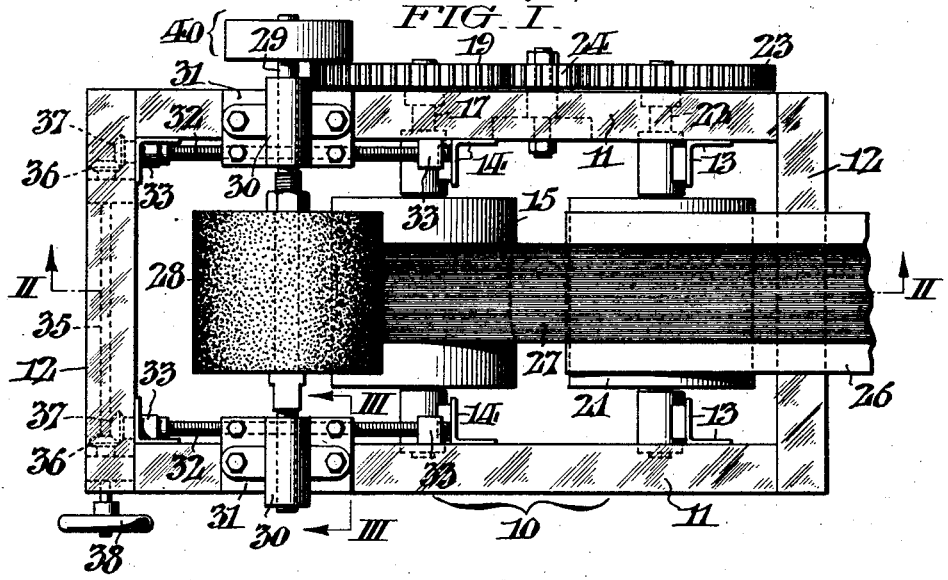
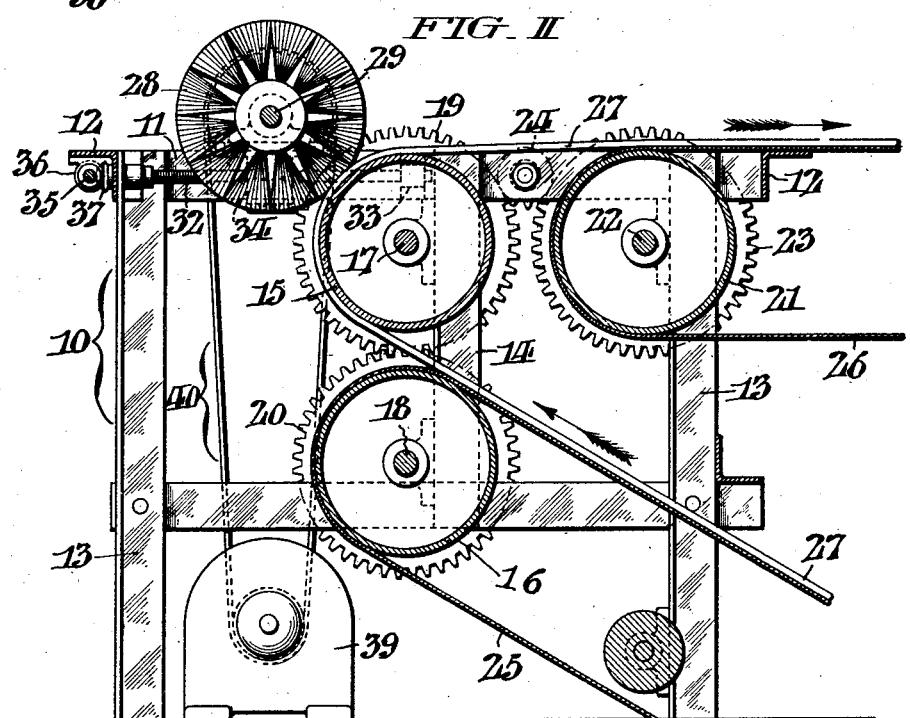
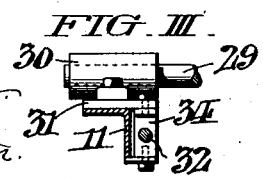
INVENTOR:
John Kearns,
BY
ATTORNEYS.
WITNESSES:

Patented Aug. 30, 1927.

1,640,834

UNITED STATES PATENT OFFICE.

JOHN KEARNS, OF CONSHOHOCKEN, PENNSYLVANIA, ASSIGNOR TO THE LEE TIRE & RUBBER CO., OF CONSHOHOCKEN, PENNSYLVANIA, A CORPORATION OF PENNSYLVANIA.

MACHINE FOR TREATING RUBBER.

Application filed May 16, 1922, Serial No. 561,549. Renewed January 27, 1927.

This invention relates to rubber manufactures and more particularly to the treatment of uncured rubber stock used in the manufacture of pneumatic tires or the like.

In the practice of tire making by building up the structure from laminations or stock of uncured rubber the several parts or laminations such as the tread and side wall in continuous layers are usually formed in a tubing machine, the principal function of which is to express the material through a die imparting the desired cross sectional contour to the strip. The product strip subsequent to its delivery from the machine presents a smooth or glossy surface suggesting the presence of a film thereon, which fact accounts for the difficulty entailed in effecting intermolecular cohesion between the material of the strip and that of the carcass of the tire during vulcanization unless the surface of the strip is previously treated with a view to correcting or removing the undesirable gloss.

The object of the present invention therefore is to provide a machine for treating the surface of uncured rubber stock, in the interim between the point of delivery of the stock from the forming machine to the point of utilization, whereby to avoid the necessity of extra handling of the material, the treatment consisting in subjecting the surface of the material to abrasive action effected through the medium of a rotary brush having comparatively stiff bristles, to the end that the gloss may be entirely removed and the surface conditioned so as to ensure intimate cohesion with the surfaces to which the material is to be joined.

In addition to the foregoing this invention comprehends improvements in the details of construction and arrangement of the correlated parts to be hereinafter set forth and particularly pointed out in the appended claims.

In the accompanying drawings, Fig. I is a view in top plan of a rubber stock treating machine constructed in accordance with my invention.

Fig. II is a view of the machine in longitudinal section taken on the line II—II of Fig. I; and Fig. III is a detail view in section taken on the line III—III of Fig. I.

With reference to the drawings, 10 indicates a quadrangular frame constructed as in the present instance of standardized structural forms and comprising pairs of longitudinal and lateral members 11 and 12 respectively, corner struts 13 and a pair of vertical braces 14. A pair of rollers 15 and 16 functioning respectively as work supporting and conveyor belt pulleys are mounted in superposed relation upon and between the braces 14 through the instrumentality of bearing blocks for the journals of the rollers, the latter consisting of shafts 17 and 18, each having one end extending beyond its bearing to support a spur gear designated with respect to their shafts as 19 and 20. The gears are in mutually meshing relation to coordinate the movements of the rollers which are arranged transversely of the frame in parallelism with a third roller 21 of corresponding size, fixed upon a shaft 22 which is in turn supported in bearing blocks carried by a pair of end struts 13. One end of the shaft 22 protrudes to support a spur gear 23 designed to be driven by the gear 19 through an intermediate idler 24 suitably supported upon the frame.

As intimated above the machine of the present invention is intended to cooperate with another machine which fabricates the product. In practice it is desirable that the product making machine be located at a point below the stock treating machine and the product conveyed from one machine to another by means of an endless conveyor or belt such as is shown in the accompanying drawings at 25, the pulley 16 being provided to support the discharging end of the conveyor at a point adjacent the roller 15. It is also desirable that the product, as fast as it is treated be carried away to the point of utilization and to that end the pulley 21 is employed as an operating support for one end of a horizontal, endless conveyor 26. Thus the rubber stock in the form of a strip, indicated at 27 is placed endwise upon the upper stretch of the belt 25 with its glossy side down and when brought to the roller 15 is trained around the latter, redirected horizontally and supported upon the upper stretch of the belt 26. The glossy side of the strip will thus be exposed while passing around the roller 15.

The stock treating means comprises a cylindrical brush 28 having stiff bristles such as wire and mounted on a shaft 29 in turn journalled in bearing blocks 30, each of which is mounted on an individual plate 31. The plates 31 are slidably supported, one upon each member 11 of the frame for longitudinal movement induced through the medium of threaded rods 32 one for each plate. Said rods are anchored at their ends in suitable brackets 33 carried by the frame while their intermediate portions are engaged by internally threaded members 34, one of which is carried by each plate 31, as illustrated clearly in Fig. III. To ensure uniform lateral movement of both ends of the shaft 29 the threaded rods 32 are rotated in unison by means of a transverse shaft 35 having a pair of bevel gears 36 fixed thereto adapted for meshing engagement with bevel gears 37 one fixed to one end of each threaded rod 32, the shaft being supplied with a hand wheel 38 for rotating the same. The brush is preferably driven in a manner independent of the remaining mechanism and is effected in the present instance by means of an electric motor 39 whose power is transmitted to the brush through the medium of a belt and pulley arrangement comprehensively indicated at 40. The brush is rotated preferably in a direction reverse to the direction of travel of the adjacent portions of the stock strip.

In operation the stock strip indicated at 27 is carried upward in a substantially continuous length and after being reversed by passage around the roller 15 is subjected at one side to the abrasive action of the brush 29, the degree of pressure of which may be varyingly applied to the stock by adjusting the movement thereof toward and away from the roller 15 through the medium of the hand wheel 38. As a result of this treatment the gloss is entirely removed from the treated side of the strip and in lieu thereof a roughened or pitted surface is imparted ensuring proper cohesion of the surface during vulcanization. The treated portion of the strip is carried in a continuous manner by the conveyor 26 to an operator dedicated to the duty of severing the strip into appropriate lengths. As the stock strip may be comparatively thick it is desirable that the roller 15 be circumferentially grooved so that the strip may not protrude unduly above the surface of the roller. The shape of the groove may be designed so as to closely conform to the cross sectional contour of the strip. Motion may be imparted to the rollers in any manner found convenient or desirable.

Having thus described my invention, I claim:

1. A machine for treating the surface of rubber stock in the form of a strip of indefinite length comprising a rotary abrasive element, a conveyor to bring the strip to the abrasive element, a roller around which the strip is trained to present succeeding portions of its surface to the action of the abrasive element, a conveying means to carry away the treated portions of the strip, and independent means for operating the abrasive element and the roller and conveying elements.

2. A machine for treating the surface of rubber stock in the form of a strip of indefinite length comprising a quadrangular frame of standardized structural sections, an abrading brush journalled transversely of said frame, a source of power for rotating the brush, a conveyor to conduct the strip to the abrading brush, a roller around which the strip is trained to present succeeding portions of its surface to the action of the abrading brush, a conveyor to carry away the treated portion of the strip, and independently operated means coordinating the movement of the aforesaid roller and conveyors.

3. A machine for treating the surface of rubber stock in the form of a strip of indefinite length comprising a quadrangular frame of standardized structural sections, an abrading brush journalled transversely thereof, a source of power for rotating the brush, a conveyor to conduct the strip to the abrading brush, a roller around which the strip is trained to present succeeding portions of its surface to the action of the abrading brush, independently operated means coordinating the movement of the aforesaid roller and conveyor, and means for adjusting the abrading brush relative to the roller.

In testimony whereof, I have hereunto signed my name at Conshohocken, Pennsylvania, this 9th day of May, 1922.

JOHN KEARNS.